United States Patent
Nijim et al.

(10) Patent No.: US 11,252,484 B2
(45) Date of Patent: *Feb. 15, 2022

(54) UPDATING CONTENT URL FOR NON-LINEAR VIDEO CONTENT

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Eric S. Roberts, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,618

(22) Filed: Dec. 9, 2019

(65) Prior Publication Data

US 2020/0112773 A1    Apr. 9, 2020

Related U.S. Application Data

(63) Continuation of application No. 14/031,016, filed on Sep. 18, 2013, now Pat. No. 10,506,305.

(51) Int. Cl.
*H04N 21/858* (2011.01)
*H04N 21/4725* (2011.01)
*H04H 60/32* (2008.01)

(52) U.S. Cl.
CPC ......... *H04N 21/8586* (2013.01); *H04H 60/32* (2013.01); *H04N 21/4725* (2013.01); *H04N 21/858* (2013.01)

(58) Field of Classification Search
CPC .. H04H 60/32; H04N 21/858; H04N 21/8586; H04N 21/4725
USPC .......................................................... 725/14
See application file for complete search history.

(56) References Cited

U.S. PATENT DOCUMENTS

| | | | |
|---|---|---|---|
| 7,941,564 B2* | 5/2011 | Gebhardt | H04N 21/8352 709/248 |
| 7,991,770 B2* | 8/2011 | Covell | H04H 60/58 707/722 |
| 9,917,874 B2* | 3/2018 | Luby | H04N 21/234327 |
| 10,506,305 B1 | 12/2019 | Nijim et al. | |
| 2005/0005303 A1* | 1/2005 | Barone | H04N 21/4331 725/110 |

(Continued)

*Primary Examiner* — John W Miller
*Assistant Examiner* — Omer Khalid
(74) *Attorney, Agent, or Firm* — Merchant & Gould P.C.

(57) ABSTRACT

Dynamic uniform resource locator (URL) transmission may be provided for allowing a user to view a non-linear video content item along with additional content in order to provide a richer and deeper viewing experience giving more control to the user during video viewing. An indication may be provided to the user indicating the availability of additional interactive content associated with the non-linear video in a variety of different ways. Upon user request, the content associated with the URL may be updated or historic content presented to the user in order to present the non-linear video content combined with the additional content in a hybrid fashion. The transmitted URL may be static, or the URL may be dynamically updated based on one or more factors, such as time of day or action by the user or content provider.

20 Claims, 11 Drawing Sheets

(56) References Cited

U.S. PATENT DOCUMENTS

| | | |
|---|---|---|
| 2007/0300263 A1 | 12/2007 | Barton et al. |
| 2011/0126107 A1 | 5/2011 | Barton et al. |
| 2013/0014159 A1 | 1/2013 | Wiser et al. |
| 2013/0031208 A1* | 1/2013 | Linton .................... G09B 7/02 709/217 |
| 2013/0073400 A1 | 3/2013 | Heath |
| 2013/0114940 A1 | 5/2013 | Merzon et al. |
| 2013/0305292 A1 | 11/2013 | Chen et al. |
| 2014/0244849 A1 | 8/2014 | Rizzo |

* cited by examiner

XYZ TV PROVIDER
PLAY RECORDINGS

3:23 pm
Thursday, 3/5

TV GUIDE

Recorded show 1
Thurs 04/12 at 6 pm
30 mins., A roundup of the day's events. (Newscast)

Select to play

| | By Date |
|---|---|
| ✓ Recorded show 1 | 04/12/2007 |
| ☐ Recorded show 2 | 04/09/2007 |
| ☐ Recorded show 3 | 04/08/2007 |
| ☐ Recorded show 4 | 04/05/2007 |
| ☐ Recorded show 5 | 04/03/2007 |
| ☐ Recorded show 6 | 03/29/2007 |

202

225

PLAY   DELETE   SORT   GO BACK

FAMILY Channel

Viewing Party
Watch and chat with friends online
Host one now

Presented by XYZ COMPANY

ALL NEW EPISODES
Mondays at 8/7c
FAMILY Channel

Shows | Movies | Watch | Schedule | Games | Boards | Music | Green Room

Full length videos so much, so many    see all

Other videos you've got to see this    see all

Community featured

Join the "series name" viewing party
Presented by
XYZ COMPANY
Watch and chat now >>

Hot of the blogs the inside scoop upcoming events
Show 1
ALL NEW
Mondays
at 8/7c
Show2
ALL NEW
Mondays
at 9/8c
Show 3
Premieres June
22 at 8/7c

| Schedule for tues 5/5/09 | |
|---|---|
| 6:30 pm | Show 2 name and description |
| 7:00 pm | Show 3 name and description |
| 7:30 pm | Show 4 name and description |
| 8:30 pm | Show 5 name and description |

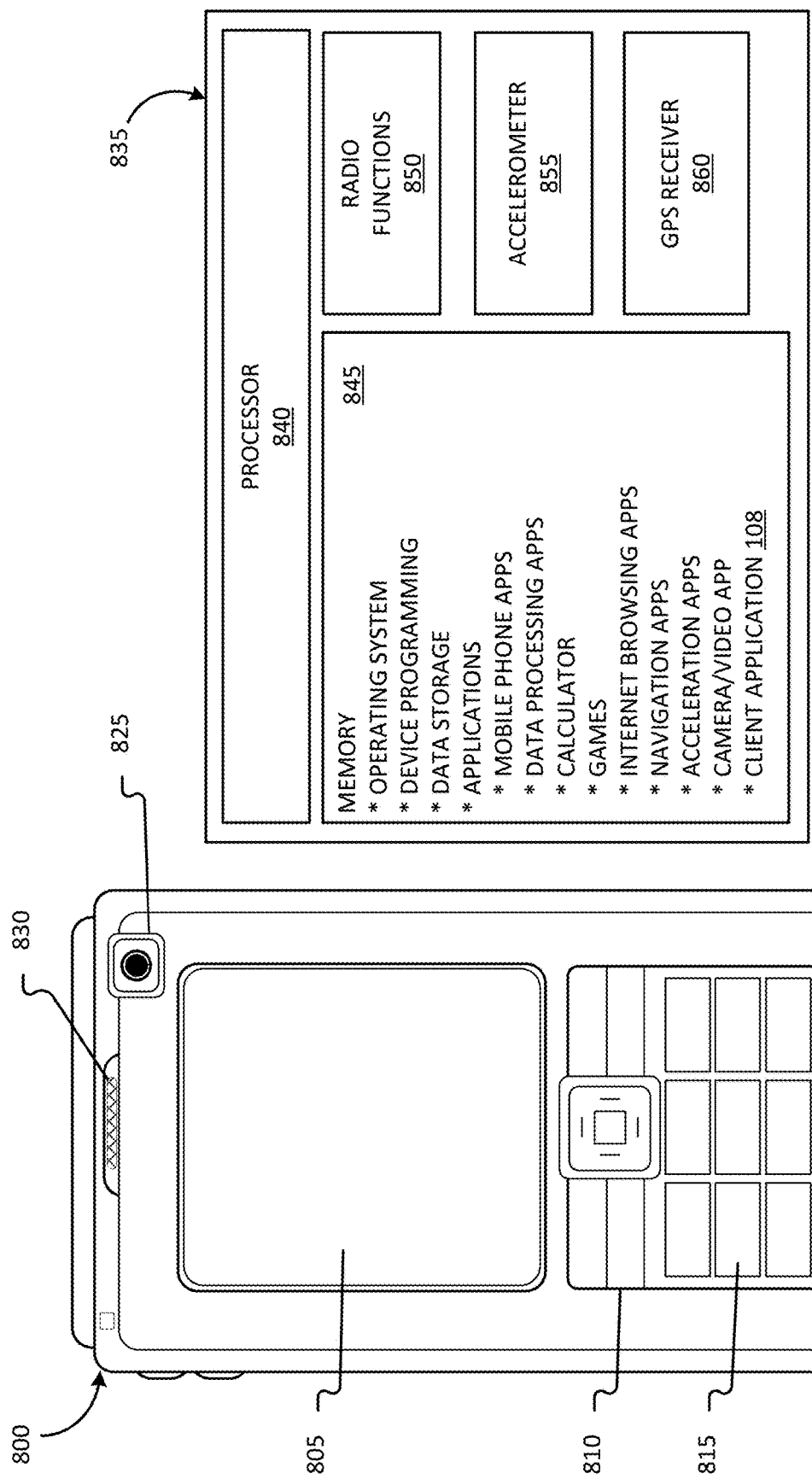

UPDATING CONTENT URL FOR NON-LINEAR VIDEO CONTENT

CROSS-REFERENCE TO RELATED APPLICATIONS

This application is a continuation of U.S. application Ser. No. 14/031,016, filed Sep. 18, 2013, and now U.S. Pat. No. 10,506,305, which is hereby incorporated by reference in its entirety herein.

BACKGROUND

Video consumers today have embraced the interactive TV system which offers a completely unique and enjoyable experience. Growing numbers of consumers choose viewing content via streaming alternatives because they like more control over the video content. In addition, the way people use devices while accessing content is also changing as "multi-screening" or the use of multiple screens simultaneously has become a new norm. More consumers use a second device in some capacity while watching television. This media multitasking may be great for consumers, but with people dividing their attention between screens, the pressure may be increased on advertisers, content creators, content providers etc., to create compelling, engaging viewing experiences that span devices and content delivery systems. Additionally, in-stream advertising holds the potential to tell advertisers when and whether viewers consumed a content item, whether they followed through on embedded calls-to-action, and so forth. This may require taking a holistic approach to the content strategy, adjusting advertising to fit the consumer's multi-screen behavior, and the context of how the consumers use each device.

It is with respect to these and other considerations that the present invention has been made.

SUMMARY

Embodiments of the present invention provide for replacing and/or updating content URL for non-linear video across one or more devices. Dynamic uniform resource locator (URL) insertion/transmission may be provided for allowing a user to view a non-linear video content item along with additional content in order to provide a richer and deeper viewing experience giving more control to the user during video viewing. Non-linear video content comprises digital video recording (DVR) recordings and Video on Demand (VOD) content. An indication may be provided as to the availability of additional interactive content associated with the non-linear video in a variety of different ways, for example, display of an icon overlaid on a viewing guide user interface, a menu option, a folder with a list view of non-linear video content items with associated additional interactive content, and the like. Upon user request, the content associated with the URL may be presented to the user in order to present the non-linear video content combined with the additional content in a hybrid fashion. The transmitted URL may be static, or the URL may be dynamically updated based on one or more factors, such as time of day, content (additional content available or video content being played), or action by the user or content provider.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 2A is an illustration of a DVR user interface wherein the application may indicate the availability of interactive content.

FIG. 3B is an illustration of a user interface displayed on device wherein the video content is being delivered in a hybrid fashion along with the additional interactive content.

FIGS. 8A and 8B illustrate a suitable mobile computing environment with which embodiments may be practiced.

DETAILED DESCRIPTION

Figure 1:
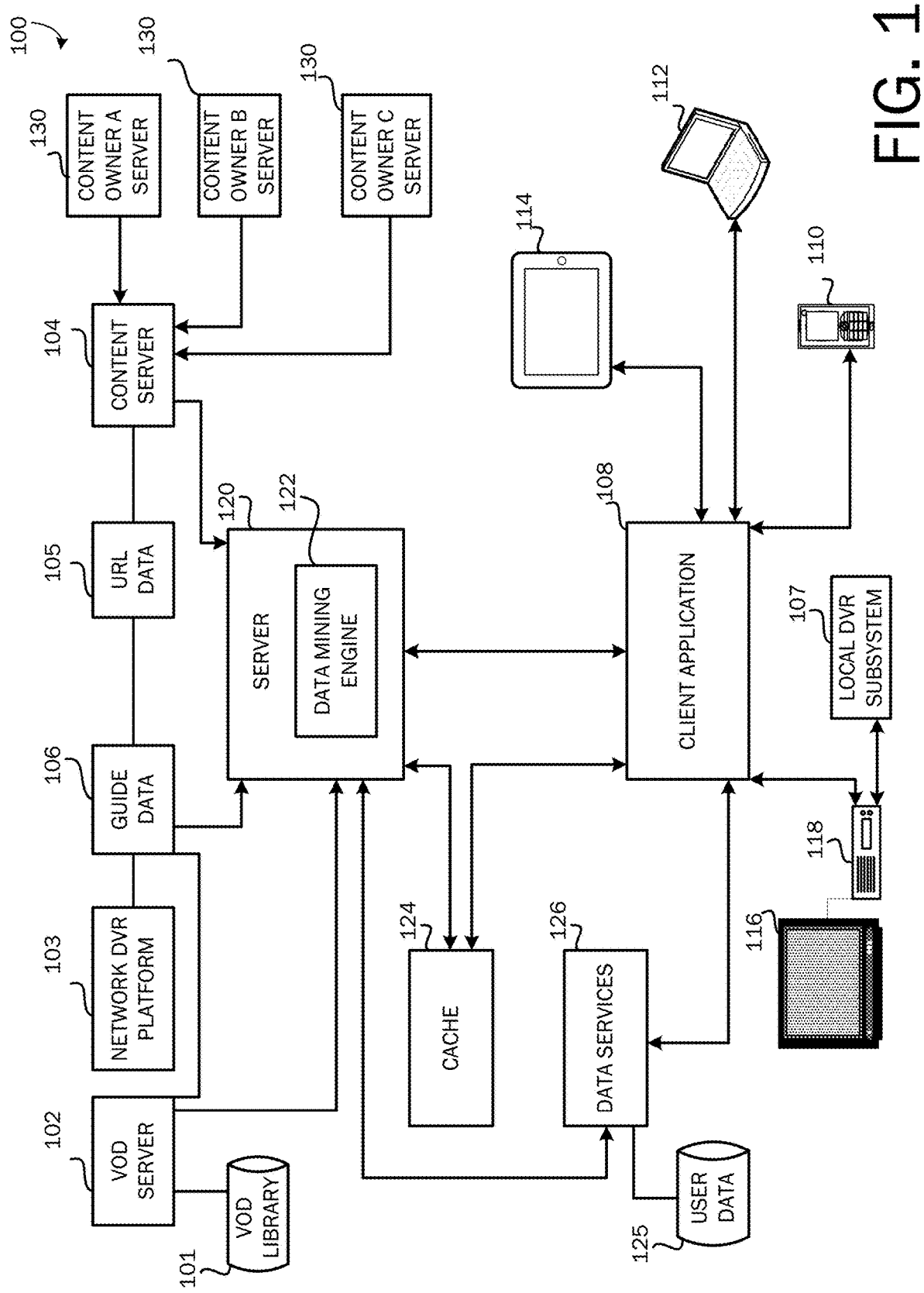
FIG. 1 is a simplified block diagram of a system for replacing and/or updating content URL for non-linear video across one or more devices.

As briefly described above, embodiments provide for replacing and updating content URL for non-linear video across one or more devices. Dynamic uniform resource locator (URL) insertion/transmission may be provided for allowing a user to view a non-linear video content item along with additional content in order to provide a richer and deeper viewing experience giving more control to the user during video viewing. An indication may be provided to the user indicating the availability of additional or updated interactive content associated with the non-linear video in a variety of different ways, for example, display of an icon overlaid on a viewing guide user interface, a menu option, a folder with a list view of non-linear video content items with associated additional interactive content, and the like. Upon user request, the content associated with the URL may be presented to the user in order to present the non-linear video content combined with the additional content in a hybrid fashion. The inserted/transmitted URL may be static, or the URL may be dynamically updated based on one or more factors, such as time of day, nature of the content available, or action by the user or content provider. Embodiments may be utilized on various types of viewing devices including, without limitation, televisions, wired and wireless viewing devices, mobile viewing devices (e.g., mobile telephones, netbooks, tablet or slate type computers, notebook computers, and laptop computers), or other hand held devices that may have browser capabilities.

According to embodiments, given the interactive experience provided by video and other content available on the Internet and other sources, pressure has increased on advertisers, content creators, content providers, etc. to create compelling, engaging experiences that span devices and content delivery systems. Embodiments provide for more in-depth content to be presented on the display device in association with the selected non-linear video content by providing Internet-based content associated with a "being viewed" video content item, for example, by providing information from a website of a provider of a video content item so that a user may view video content and associated website information simultaneously.

For example, if a user is viewing a pre-recorded television video content presentation, such as a presentation provided by CNN on the user's Internet capable television set, or computing device capable of connecting to Internet-based content there may be one or more interesting stories, news items, informational content items, and the like available at an Internet-based website (e.g., CNN.com) associated with the "being viewed" content. According to embodiments, a URL at which the additional content may be located and accessed may be inserted into the video stream or transmitted to the viewing device outside the video stream via various control, management, and system communication methods, and an indication of the availability of the additional and/or updated content may be made to a user of the "being viewed" content. As known by those skilled in art, the various control, management, and system communication methods that may be used for the transmission of the URL to the viewing device may include but is not limited to out of band data flow, inclusion in the metadata, service tag associated with channel lineup data, and the like. Upon selection of an appropriate function button or control (e.g., via a remote control device, associated soft or hard keyboard, voice command, etc.), the non-linear video content may be blended with the content available via the transmitted URL (e.g., CNN.com) so as to provide deeper, richer video viewing experience as compared to traditional video content.

A given content provider may provide the non-linear content items and additional content items in a variety of display configurations. Following from the above example, CNN may choose to scale their video and place it in the top left corner of a display surface, align their news stories along the right side, and their video clips along the bottom. The user may, through a functionality control interface, for example a remote control device, select a companion video clip, text-based news item, or the like to allow the user to operate within an interactive environment that CNN has provided as part of their CNN.com experience while the user is viewing the "being viewed" video content.

The video may be scaled on the viewing screen by the content owner or content provider etc. based on business agreements. According to an embodiment, the video may also be scaled due to arrangements between the user and the content owner or content provider so as to provide the user with third party content along with the "being viewed" video content if he/she wishes access to other content, for example, paid content (such as the Video On Demand content) for free or at a discounted price, etc. For example, a user may get access to a pay-per-view video at a discount or at no charge if he/she accepts to consume the video content in hybrid form where additional content (e.g. advertisements, sponsored content from third parties, and the like) is displayed in association with the video content. According to another embodiment, the content owner or the content provider may also wish to leave the video full screen and just display additional information along the bottom of the video (or other suitable location) as an example of the interactive content.

Embodiments of the present invention may be applied to any video decoding display device that can run an associated Internet browser as part of the user interface application layer. For example, devices may include, but are not limited to, a mobile communication device such as a mobile phone, a computing device, such as a desktop computer, a laptop computer, etc., a wireless computing device, such as a tablet computing device, a television, such as an Internet-connected television or a television connected to a network-connected device, such as a set top box (STB).

In many cases, a given television show or presentation, is associated with an Internet-based website or web page dedicated to the show or presentation. Embodiments of the present invention bring that information to the user to provide an interactive, deeper, viewing experience upon user selection. The result may be a hybrid video viewing experience that may include a blend of traditional non-linear video content with Internet-based or available content and services from content providers and/or content owners, such as broadcasters, online providers and CE manufacturers including digital video recording (DVR) providers, video-on-demand (VOD) providers, interactive advertising and content personalization providers, voting system providers, games and social networking, as well as, a variety of video programming-related content and services.

Consider, for example, if a user recorded an episode of a popular television show, the video stream that is recorded may include metadata that in turn may identify or include additional interactive content associated with the recorded content. The additional interactive content may include various stories or information pertaining to the show or other content that may be available from the show content owner, content provider or other source. The additional content may be defined by a URL that may be associated with the video stream. When the user requests that non-linear video content be played on the client device, that request may be sent by the client device to a server along with a viewer identifier. A viewer identifier may include various data, including but not limited to, viewer's device information, demographic information, user profile, user's taste profile, user's viewing history, date/time, viewer location, etc. The additional interactive content available via the associated URL may be dynamically updated based on the viewer identifier, and information associated with the viewer identifier along with other content information (e.g. information about a sponsored promotional event) available to the content owners, content providers etc. may be analyzed so as to provide the user with personalized additional interactive content.

When a request is received to play the recorded non-linear content, the associated URL that was recorded with the original linear video as part of the metadata may be analyzed to determine if the metadata has changed (e.g., whether a URL associated with the original URL has been replaced and/or updated). If the metadata has changed, the URL within the metadata may be updated and the new additional interactive comment may be transmitted per the content provider's discretion. According to an embodiment, after the indication is received that the user may desire to view the recorded content in an interactive fashion, an option may be provided to the user to allow the user to choose to consume the historical interactive content that was tagged at the time the linear video content was being streamed or to consume updated, real time interactive content, provided the historical metadata and the updated metadata are both available.

There may be times, when the user may actually wish to consume the recorded video content with historical metadata to get the linear viewing interactive experience. For example, when viewing prerecorded live event, the user may like to experience the additional interactive content that was available at the time of the linear broadcast to get the appropriate feel of the live event. For another example, when a user watches a recorded show on the next day, a URL associated with that show may be updated showing additional content based on the linear show that may be aired at that time. In such a case, if the URL is updated, the user may not get a good interactive experience because the updated additional content may not match a context of the recorded show.

Alternatively, there may be times when the additional interactive content that may be recorded with the linear content, may include certain event information or advertising pertaining to that linear broadcast time. Those additional content items, defined via the URL, may now be irrelevant considering that the user may be viewing the recorded content after the elapse of the event or the advertising offer. In such cases, it may be important to provide an updated and refreshed additional interactive content which may apply to the user based on his viewer identifier as described above.

According to embodiments, the device used to view the non-linear content such as a DVR recorder/player device or a VOD content delivery device may also provide the additional interactive content. For example, it may be determined by an application server in view of the viewer identifier received for the user that the device used to view the content is a mobile computing device such as a tablet computer or smartphone, thus the additional interactive content that is transmitted may be tailored to the specific device. For example, if a user is using device capable of electronic gaming to view his selected VOD content, the additional interactive content may include a game related to video content instead of a video or the like.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram of a system 100 for replacing and updating content dynamic uniform resource locator (URL) and associated content for non-linear video across one or more devices for providing additional content in association with the non-linear video stream and/or companion applications as described above. Components of the system 100 may operate as a distributed system where each component is accessed via a suitable network, or the components may operate together as an integrated system. As illustrated, content server 104, URL data 105, guide data 106, local DVR subsystem, network DVR platform 103, and VOD server 102 may be provided. Content server 104 may include video content data and metadata available via a service provider, such as cable television (CATV) services system (as illustrated and described below with reference to FIG. 6), satellite television provider, etc. or on the Internet such as YouTube®, Hulu®, etc. The data and metadata may include information such as video content title, storyline, cast, genre, rating, release date, images, etc. Guide data 106 may include channel information, programming information, network information, etc. URL data 105 may include interactive content or pointers to the interactive content on the internet associated with the non-linear content provided by the content owners' A, B or C servers 130 or content providers. Network DVR platform 103 may comprise various DVR recordings or pointers to various DVR recordings, recorded on the network DVR that may be available for viewing to the user. DVR recordings may also be stored locally via a local DVR subsystem 107 connected to the set top box attached to the TV 116. VOD server 102 may provide access to various VOD content items, stored either within the VOD library 101 maintained by the content provider, or the VOD content that may be available via the internet. The association of the interactive content to the non-linear video may be based on time, which may be triggered at a specific point of time in the non-linear video, based on content, and/or may be based on action when the user switches to a particular video content item, etc.

As will be described further below, according to an embodiment, when the user selectively requests the additional interactive content, an address field may be populated in a web browser associated with of the display device, derived from the metadata, which may or may not be hidden to the user. A web query then may be performed based on the transmitted website address, after which the website HTML experience may be downloaded and rendered to create a hybrid viewing experience (video and Internet content). According to an embodiment, the rendered experience may be presented according to a variety of display configurations, including scaling the "being viewed" video content in a video viewer inside the provided Internet-based content, or the non-linear video may be managed by the content provider based on the content provider's business agreements with content owners, CE manufacturers, third party advertisers, the user, etc.

VOD server 102, network DVR platform 103, content server 104, guide data 106, and URL data 105 may be provided to a server 120 where a data mining engine 122 may be operable to analyze and sort the data and metadata, associated URL data and metadata 105, and associate the channel data and metadata 102,104, with the guide data 106. The URL data 105 may be hidden or may be displayed to the user. The associated channel/guide data may be cached. The cache 124 is illustrated in FIG. 1 as a remote element, but may be integrated with the server 120 or the client application 108. As new information becomes available, the associated channel/guide data may be updated in the cache 124.

According to one embodiment, the cached associated channel/guide data may be specific to a user profile. The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data for associating channel and guide data to specific users.

As illustrated in FIG. 1, various endpoint devices may be utilized to access video content that can leverage HTML or web technologies to display video content with additional interactive content. For example, endpoint devices may include, but are not limited to, a mobile communication device 110, such as a mobile phone, a computing device 112, such as a desktop computer, a laptop computer, etc., a wireless computing device, such as a tablet computing device 114, a television 116, such as an Internet-connected television or a television connected to a network-connected device, such as a set top box (STB) 118. An endpoint device 110,112,114,116 may be utilized to access a client application 108.

The client application 108 may be operable to receive a request from a user for accessing associated URL data 105 and to transmit an associated URL website address with a video service that can be displayed and rendered on a TV screen, in conjunction with the video service.

As illustrated and described below, an indication may be provided by the client application 108 to the user in the form of an icon in a guide display, a folder with a list view of non-linear video content items with associated additional interactive content or menu option that may indicate the availability of interactive content, etc. There may also be a special button or other selectable control available on a remote control or other suitable hard or soft key selection device which may be used to request interactive content based on availability. A secondary screen companion device such as a tablet with an associated content provision application may also be used to allow the request of the interactive experience on the display screen such as the television 116. Other suitable means for interacting with and controlling available and received content includes touch command, voice command, gesture command and combinations of various functionality interface methods and systems.

Once the user requests access of the additional interactive content through any one of the above mechanisms, the non-linear video content being played full screen may be overlaid or replaced by the content available via associated website address (URL) that has been associated with the non-linear video content thus creating a web browser-type experience and providing the user with more interactive, additional information and deeper and richer content from the content owner, content provider, third party sponsor or provider, etc.

The additional content may comprise updated information feeds from a social media website associated with the "being viewed" video content, tailored advertisements, news items, other videos and the like that may be of interest to the user based on user preferences, third party sponsored content, and the like. The associated channel/guide data/URL data may be stored in a cache 124 located on the server 120, on the application 108, or may be located remotely and accessed via a network.

FIG. 2A illustrates a DVR user interface 200 with which programming information and user interaction may be provided. According to embodiments, the interactive content provided via a given URL (described herein) may be provided via a DVR user interface as illustrated in FIG. 2A. As should be appreciated, the DVR user interface 200 is for purposes of example only and is not exhaustive of other types and layouts of user interfaces that may be used according to embodiments. Referring to the DVR user interface 200, a list may be provided wherein a listing of a variety of DVR recordings may be presented for user information and for user selection. This list may be a combined list of the DVR recordings stored in the local DVR subsystem 107 and the network DVR 103. Other information (not numbered) may be provided in the DVR user interface 200, for example, advertising information, content provider logos, and the like.

According to embodiments, an indicating icon 202 may appear as an overlay atop the DVR user interface 200 for indicating the availability of interactive content in association with one or more prerecorded content items provided or available via the DVR interface 200. As should be appreciated, the icon 202 is for purposes of example only and is not exhaustive of the vast number of visual indicators that may be displayed to alert users of the availability of associated interactive content. For example, such an indication may be provided via a displayed banner, mosaic tile, audio alert, text string or the like. In addition, a secondary screen companion device, such as a tablet, with an application operative for passing instructions for requesting interactive content may also be used to indicate availability of interactive content and to allow the request and initiation of the interactive experience on the display screen such as the TV 116.

According to one embodiment, the icon 202 may serve as a selectable control with which a user may request and initiate provision of interactive content in association with a URL associated with a given video content item as described above. Selection of the icon 202 may cause a display in the guide of Internet-based information associated with the recorded video content that will enhance the user's consumption of the video content as described herein. Alternatively, the icon 202 may be provided in association with one of the content items listed in the guide for providing Internet-based information associated with the listed content item.

As should be appreciated, the icon 202 is but one example of a selectable functionality control that may be used to request information associated with a given URL. For example, a selectable control for requesting the interactive content available via an associated URL may be provided in a menu of options, or may be provided as a designated button or key on a remote control device or on a hard or soft keyboard associated with the viewing device (e.g., TV 116). In addition, an indication icon 202 may be used to alert a user of the availability of interactive content that may be requested via other means such as voice or gesture activation.

Figure 2B:
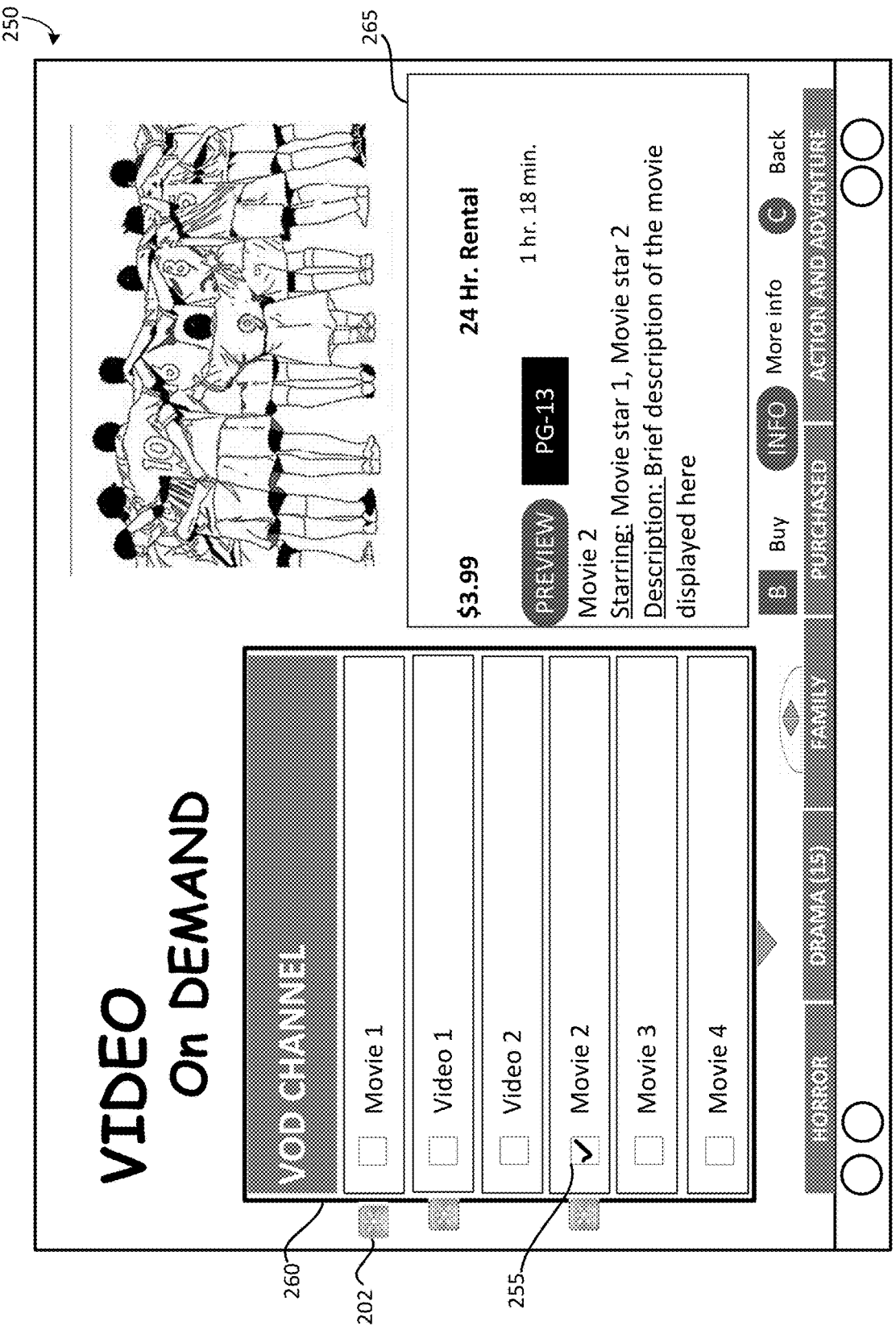
FIG. 2B is an illustration of a VOD user interface wherein the application may indicate the availability of interactive content.

FIG. 2B illustrates a VOD user interface 250 with which programming information and user interaction may be provided. According to embodiments, the interactive content provided via a given URL (described herein) may be provided via a VOD user interface. As should be appreciated, the VOD user interface 250 is for purposes of example only and is not exhaustive of other types and layouts of user interfaces that may be used according to embodiments. Referring to the VOD user interface 250, a list 260 is provided, wherein a listing of a variety of VOD content items may be presented for user information and for user selection. Other information (not numbered) may be provided in the VOD user interface 250, for example, advertising information, content provider logos, and the like. As described above for the DVR user interface, an indicating icon 202 may appear as an overlay atop the VOD user interface 250 for indicating the availability of interactive content in association with one or more prerecorded content items provided or available via the VOD interface 250.

Figure 3A:
FIG. 3A is an illustration of a traditional full screen non-linear video, displayed on a device.

Referring to FIG. 3A, a full screen non-linear video display is illustrated in which non-linear video content is provided and for which a URL may be associated for providing interactive content as described herein. As with the DVR user interface 200 illustrated in FIG. 2A, an indicating icon 202 may be provided for indicating the availability of interactive content and one or more means (as described above) may be enabled for allowing selectable request of the associated interactive content. As described above for the DVR user interface 200 and the VOD interface 250, an indication of available interactive content may be provided through various other means such as banners, mosaic tiles, audio alerts, text strings, or the like, or via a secondary screen companion device, such as a tablet, with an application operative for passing instructions for requesting interactive content may also be used to indicate availability of interactive content and to allow the request and initiation of the interactive experience on the display screen such as the TV 116.

Referring now to FIG. 3B, after requesting Internet-based content associated with a URL associated with a video content item, as described above, a hybrid interactive video experience may be provided. This experience is a result of downloading the associated URL with the hybrid web experience to the video display device. As can be appreciated, the additional content may be displayed in a variety of different ways per the discretion of the content owner, content provider, etc. For example, upon choosing to experience a given additional content associated with the full screen video playing as illustrated in FIG. 3A, the hybrid display of non-linear video combined with the interactive additional content may be presented to user as illustrated in FIG. 3B.

As should be appreciated, the hybrid interactive video experience illustrated in FIG. 3B is for purposes of example and is not exhaustive of the vast number of layouts that may be provided. That is, the display screen may be presented as an instance of a browser-type display where a variety of content items available via the associated URL may be displayed in various locations, and where the non-linear video 303 (e.g., DVR or VOD content) from which the user requested the additional interactive content may be presented in a minimized embedded player with other additional content wrapped around it. Alternatively, each additional content item may be presented in one or more mosaic-type tiles that may be disposed on a display screen while a display of the non-linear video is reduced accordingly. Alternatively, the hybrid content illustrated in FIG. 3B may be provided via a browser within a browser setup (one with the video content and another with the additional content).

The additional content provided via the URL may comprise any number of Internet-based content items, for example, a social website 301 for an associated television show with real-time feeds, cast profiles, messaging, etc. Other content items may include featured upcoming event information 302, various other sponsored shows previews 307, links to upcoming shows 308, program guides 306, links to other full length videos 305 and other videos 309 (based on the user profiles and tastes, third party sponsorships, etc.), as well as, advertisements 304 or other useful or helpful information. All of the additional content illustrated in FIG. 3B may be navigable based on predetermined business rules of content providers.

According to an embodiment, the associated URL may be automatically updated based on time of day, content being played or based on action from a user, content creator, content provider, third party content provider or sponsor, or the like. For example, if while the non-linear video is being presented to the user in a hybrid fashion, time for a 30 second advertisement is encountered, the URL may be updated with another URL associated with the advertisement content owner. For example, if the 30 second advertisement is related to sales of a popular automobile, then the URL may be updated to provide Internet-based content about the automobile in association with a video advertisement for the automobile. As an example of a user action causing an update of the URL, a user selection of a social media content item presented via a transmitted URL may cause a dynamic updating of the URL because information available via the selected social media site may have changed since the last update of the URL. For another example, at certain times of day, for example, a time of a close of business markets, a URL may be automatically updated to reflect content changes occurring around certain times.

Further, the content provider may also update the URL based on business agreements in order to display an advertisement or other content based on a scene being shown as part of the non-linear video embedded in the URL. For example, if the non-linear video may be playing a scene in which an exotic location may be shown, the content provider may update the URL associated with the non-linear video such that an advertisement of an exotic location resort may be presented as illustrated in FIG. 4.

Figure 4:
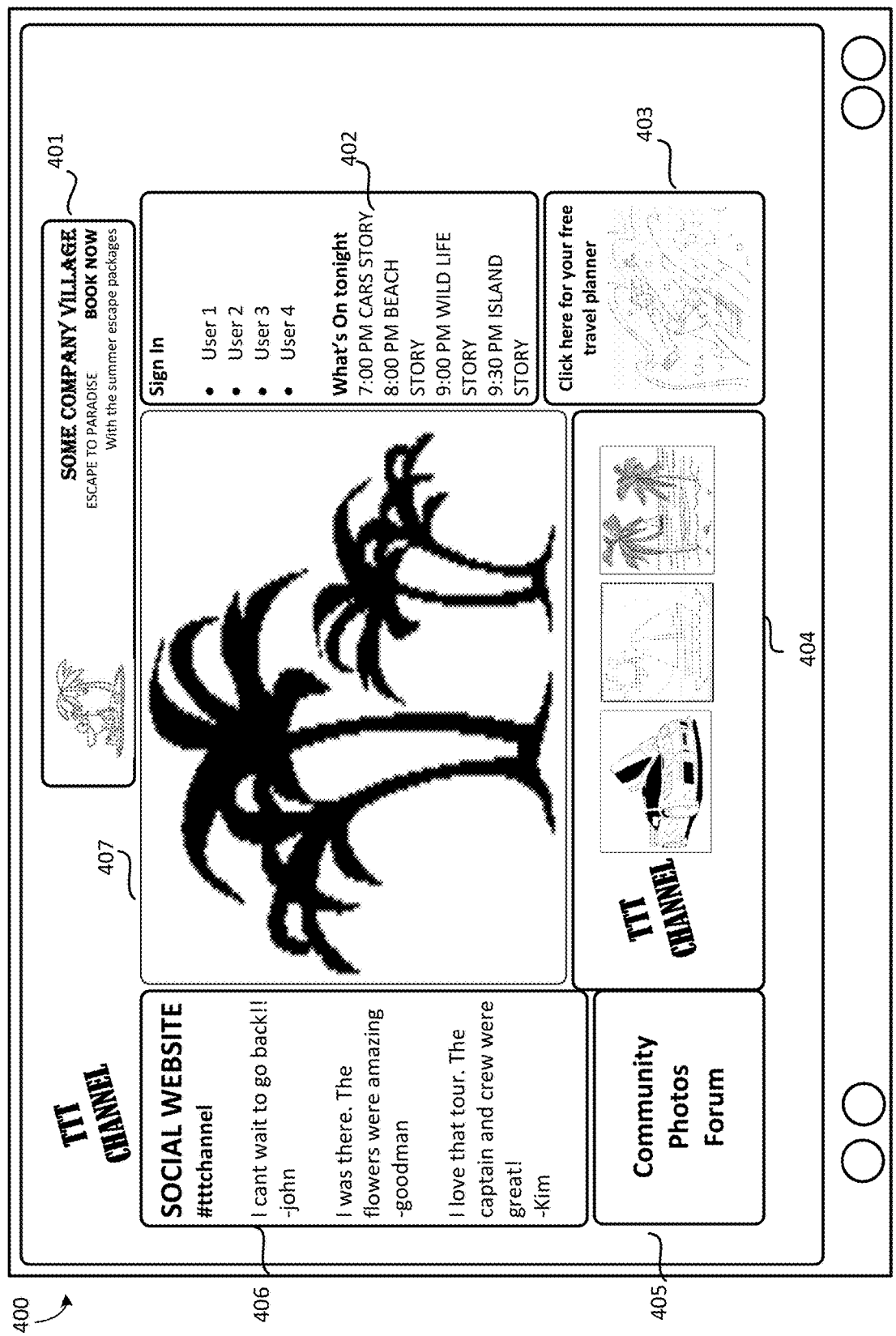
FIG. 4 is an illustration of a user interface displayed on device wherein an advertisement is being delivered in a hybrid fashion along with the additional interactive content for the advertisement provider(s).

Referring still to FIG. 4, the updated URL may have its own additional content such as the social website comments 406 of people who may have visited the example resort, community photos forum 405, other exotic locations 404 that may belong to the same content owner or may be sponsored by one or more sponsoring parties, other third party advertisements 401,403, other upcoming shows 402 information, etc. According to an embodiment, content providers may manage the additional content described herein based on various business agreements in place with the users, content owners, CE manufactures, etc.

Figure 5A:
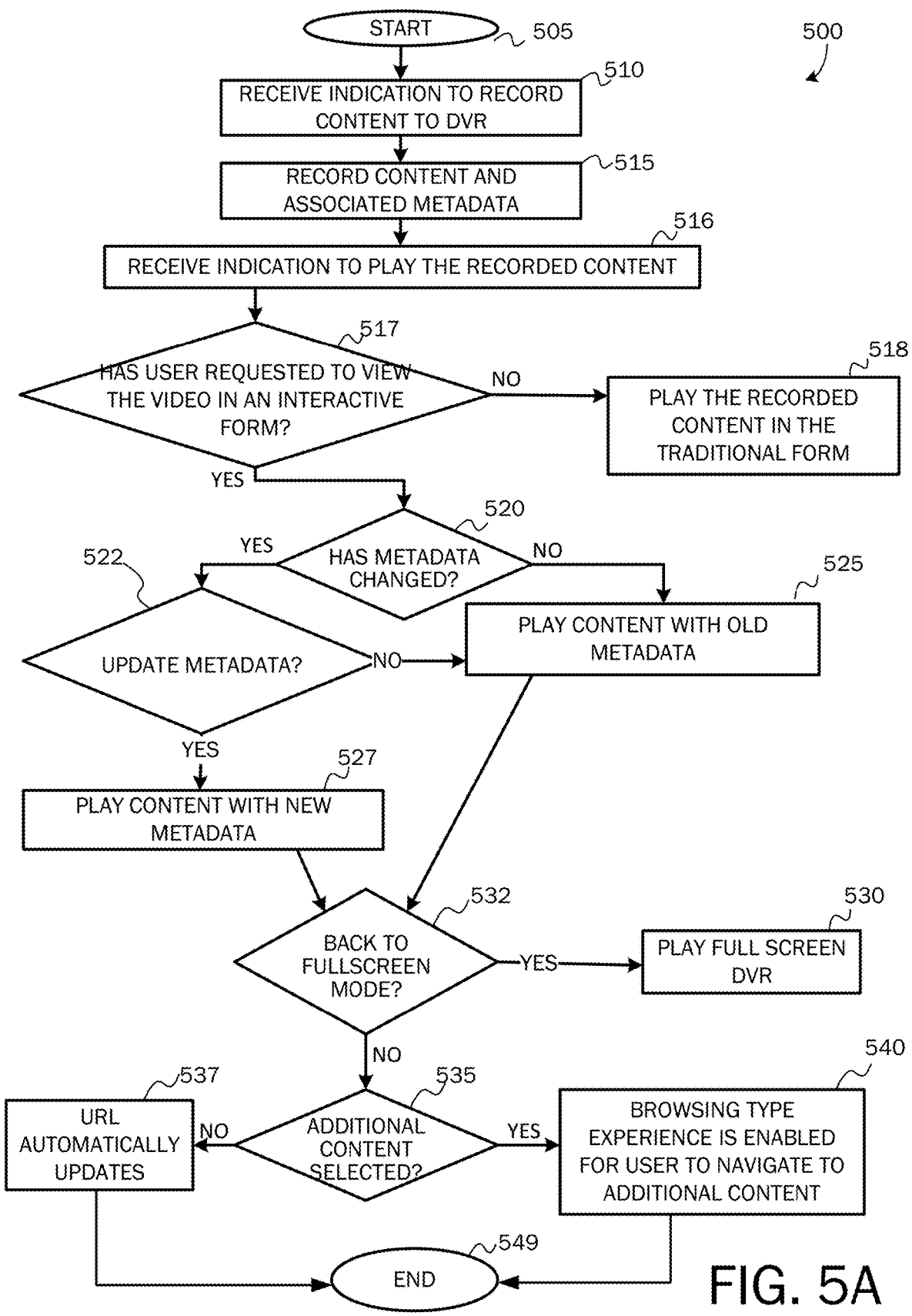
FIG. 5A is a flow chart of a method for replacing and/or updating content URL for non-linear DVR video recordings across one or more devices

FIG. 5A is a flow chart of a method 500 for replacing and updating content URL for non-linear DVR video recordings across one or more devices, according to an embodiment. The method 500 begins at OPERATION 505 and proceeds to OPERATION 510 where an indication is received from the client application 108 that a user has requested to record a video content to a DVR device or system. The request may be made via a television set 116 connected to a set top box 118 or from other devices with browsing capabilities including but not limited to a tablet, a laptop, a smart phone, a smart TV, a desktop etc. Once the indication is received, the method 500 proceeds to OPERATION 515, where the linear content is recorded for later viewing. The video recording may be stored on a local DVR device via the local DVR subsystem 107 or on a network DVR via the network DVR platform 103. The metadata associated with the linear content may also be recorded which comprises of the additional interactive content defined by the URL, program titles, storylines, cast information, genres, ratings, release dates, images, etc. A time stamp may also be tagged to indicate the metadata belonged to that particular time.

The method 500, then proceeds to OPERATION 516, where an indication is received by the client application 108, indicating a user request to view a selected DVR content 225. Once the indication is received, the method 500 proceeds to DECISION OPERATION 517, where a check is performed to determine if the user has indicated to view the recorded video content in a traditional full screen form, or in an interactive hybrid form with additional interactive content associated with the selected DVR content 225 being made available along with the recorded video content.

If the user has not indicated to view the video content in the interactive hybrid form, then the method 500 proceeds to OPERATION 518, where the recorded video content is displayed in the traditional full screen form. Alternatively, if a conclusion is made at the DECISION OPERATION 517, that the user has requested to view the recorded video content in an interactive form, the method proceeds to OPERATION 520. The content data server 104 may take advantage of the fact that the request to view the additional interactive content is coming from the user who may be actively enjoying the content. When the recorded content is requested in an interactive hybrid form, a viewer identifier may be sent to the content data server 104, which may include various data, including but not limited to, viewer's demographic information, taste profile, time, location, viewing history, etc. This may enable the content in the associated URL to be dynamically updated based on time of day, based on information about a promotional event based on user's taste preferences or location, etc.

At DECISION OPERATION 520, the metadata associated with the recorded content may be analyzed and a determination may be performed as to whether the metadata has changed or not (i.e., whether a URL associated with the content has been updated or replaced). It may be noted that when the metadata is updated, the historical metadata which comprises of the historical additional interactive content may or may not be available. If a conclusion is derived that the metadata has changed, and provided the historical metadata is available, the method 500 proceeds to DECISION OPERATION 522, where the user is provided with an option to consume the video content with the updated metadata or not.

If the user decision is received indicating that he/she would not like to update the metadata and would like to view the content with historical metadata associated with the selected video content 225, then method 500 reverts back to OPERATION 525, and the video content is displayed in an interactive hybrid form with the historical metadata associated with it (i.e., URL associated with the content when it was originally recorded). For example, when a user records a live event such as a sporting event for later viewing, he/she may wish to view the recorded video at a later time with historical metadata and get the true feel of a live event even though the event may have already finished, and even though new updated additional interactive information may be available for that event.

Referring back to DECISION OPERATION 522, if the user desires to consume the recorded video content in an interactive form with the updated additional interactive content, then the method 500 proceeds to OPERATION 527, where the recorded video content is played with the updated additional interactive content enabling the hybrid video experience (i.e. non-linear content plus web experience). The historic metadata that was downloaded at the time of recording the linear video may be substituted, thereby leveraging the associated website that was available when the linear content was recorded. The associated URL may have various elements such as the real-time feeds of a social website for a television show, various videos that may be sponsored by one or more sponsoring parties, various sponsored events, advertisements, or other content that may be presented based on the user's profile.

As the user may be viewing the recorded content, being rendered in a hybrid interactive fashion, the method 500 proceeds to DECISION OPERATION 532 where the user may decide to close the interactive content and simply watch the recorded video content in a traditional full screen display. If at DECISION OPERATION 532, the user does choose to close the interactive content and simply watch the recorded video content in a traditional full screen display, the method 500 proceeds to OPERATION 530 where full screen display of the recorded DVR content may be displayed for the user to view in traditional form.

If the user does not choose the full screen option at DECISION OPERATION 532, and instead decides to access the additional content by selecting a link to the additional interactive content displayed as part of the hybrid experience at OPERATION 535, the method 500 proceeds to OPERATION 540, where a browsing type experience may be enabled for the user to navigate through the additional content. The browsing type experience may be controlled by the content provider, content owner, etc. so that the user may not navigate away completely from the domain of the URL due to one or more business rules. According to another embodiment, the user may be allowed to experience full browsing, turning their display device from a full screen non-linear video mode or a hybrid non-linear video plus web mode to a complete web mode, wherein the user may navigate through any website or content which may not be in the domain of the content owner, content provider, third party sponsor, etc.

If the user does not select additional content provided by the interactive URL, the method 500 proceeds to OPERATION 537 where the user stays in the rich and deeper hybrid mode, watching both the non-linear video and the additional content. At OPERATION 537, the URL data associated with the non-linear video content may automatically update and advertisements or other content items may be inserted/transmitted/updated based on various factors as may be determined by the content provider, content owners etc. Some of the factors may include, time of day, content (additional interactive content available or "being viewed" content), action by the user, certain upcoming events that may be sponsored by third parties which may be of interest to the user as determined by the content owners, content providers, etc. The additional interactive content within the hybrid experience may also depend on the number of times the user has played the selected DVR recording 225. According to an embodiment, the URL may be statically tied to a video recording such that whenever a content item is played, the same static URL associated with that content may be made available to the user. Alternatively, the URL may be dynamic in nature which means that it may be dynamically updated in real time, may be redirected to a special edition webpage or may be updated during advertisement presentation boundary to provide the user with an advertiser's additional interactive content as illustrated in FIG. 4.

Consider for example that a user is viewing the recorded non-linear video broadcast of CNN and there is an associated URL for that content, but the user is watching the broadcast in the traditional form (i.e., no additional URL content). When the commercial break portion of the recorded non-linear video is being played, provided the user is not manually forwarding it, the associated URL may be redirected to the hybrid website of the content owner of the advertisement. At that point, if the user initiates the interactive content, then the non-linear video display may automatically switch to and load the advertisement and associated hybrid web experience, and then once the commercial break is over, the display may switch back to the interactive web experience from CNN.com. The associated URL may keep updating, as the non-linear video content keeps changing, as long as the user may explicitly select to go back to viewing the non-linear broadcast in the traditional full screen form.

According to another example, the video content may switch back to its non-linear full screen form when the user changes the selected recorded show 225, and then the user may have to indicate the desire to watch the recorded content in the interactive fashion again for the new selected recorded DVR content if the interactive content exists for that channel broadcast for the current selected video content (e.g., recorded show). According to yet another example, at a given time (e.g., at top of the hour), a new or updated associated URL may be triggered and retrieved for the video content. If an updated or new URL is not available, then a static URL for that video content may be transmitted by default. Embodiments may also provide for updating the associated URL in real time so that as and/or when a new URL is associated with a non-linear video item, the URL is retrieved and rendered in real time to provide more updated interactive content for the user.

The method 500 ends at OPERATION 549.

Figure 5B:
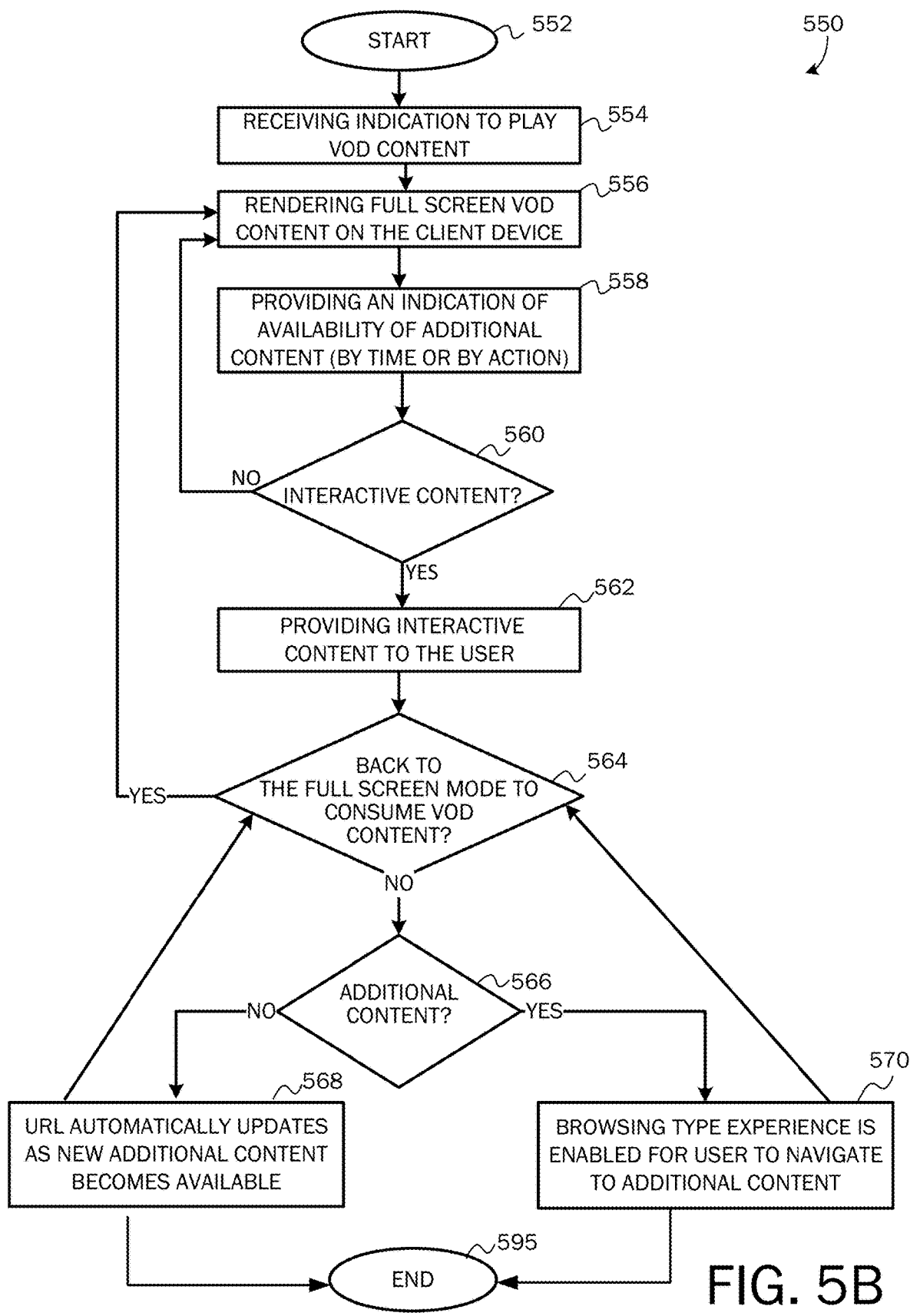
FIG. 5B is a flow chart of a method for replacing and/or updating content URL for non-linear VOD content across one or more devices.

FIG. 5B is a flow chart of a method 550 for replacing and updating content URL for non-linear VOD content across one or more devices, according to an embodiment. The method 550 begins at OPERATION 552 and proceeds to OPERATION 554, where an indication may be received from a user to play VOD content. The method 550 then proceeds to OPERATION 556 where traditional full screen video content may be rendered on the client device. The method 550 may then proceed to OPERATION 558 where an indication may be provided to the user via the client application 108 that an additional interactive content may be available for a specific VOD content 255. The indication may be provided as an icon on the VOD user interface 250 as illustrated in FIG. 2B. As can be appreciated, if more than one VOD content in the VOD content list 260 has additional interactive content associated with the VOD content, then each VOD content item associated with interactive content may have an icon 202.

At DECISION OPERATION 560, the user may accept to consume the VOD content in an interactive hybrid fashion, with additional interactive content associated with the VOD content displayed simultaneously with the VOD content. As described above, according to an embodiment, the indication 202 may be displayed on full screen video display as shown in FIG. 3A or may be provided as a menu option, a pop up, a mosaic, a banner and the like. If at DECISION OPERATION 560, the user does not accept to consume the VOD content in a hybrid form, then the method reverts back to OPERATION 556 where full screen VOD content may be rendered in a traditional manner.

If at DECISION OPERATION 560, the user does accept to consume the VOD content in an interactive hybrid form, the method 550 proceeds to OPERATION 562, where the VOD content is presented to the user in an interactive hybrid form simultaneously with the additional interactive content associated with the VOD content defined by an associated URL.

As the user may be viewing the recorded content being rendered in a hybrid interactive fashion, the method 550 proceeds to DECISION OPERATION 564 where the user may decide to close the interactive content to simply watch the VOD content in a traditional full screen display. If at DECISION OPERATION 564, the user does choose to close the interactive content to simply watch the recorded video content in a traditional full screen display, the method 550 proceeds to OPERATION 556 where full screen display of the VOD content may be displayed for the user to view in traditional form.

If the user does not choose the full screen option at DECISION OPERATION 564, and instead decides to access the additional content by selecting the link to the additional interactive content displayed as part of the hybrid experience at OPERATION 566, the method 550 proceeds to OPERATION 570, where a browsing type experience may be enabled for the user to navigate through the additional content. The browsing type experience may be controlled by the content provider, content owner, etc. so that the user may not navigate away completely from the domain of the URL due to one or more business rules. As mentioned earlier, according to another embodiment, the user may be allowed to experience full browsing, turning their display device from a full screen non-linear video mode or a hybrid non-linear video plus web mode to a complete web mode, wherein the user may navigate through any website or content which may not be in the domain of the content owner, content provider, third party sponsor, etc.

If the user does not select additional content provided by the interactive URL, the method 500 proceeds to OPERATION 568 where the user stays in the rich and deeper hybrid mode, watching both the non-linear video and the additional content. Also, at OPERATION 568, the URL data associated with the non-linear video content may automatically update and advertisements or other content items are inserted/transmitted/updated, based on various factors as may be determined by the content provider, content owners, etc. Some of the factors may include, time of day, content (additional interactive content available or non-linear video content), action by the user, location of the device which is used to view the content, certain upcoming events that may be sponsored by third parties which may be of interest to the user as determined by the content owners, content providers etc. The additional interactive content within the hybrid experience may also depend on the number of times the user has played the selected VOD content 255. According to an embodiment, the URL may be statically tied to a video recording such that whenever a viewing content is played, the same static URL associated with that content may be made available to the user. Alternatively, the URL may be dynamic in nature which means that it may dynamically be updated in real time, may be redirected to a special edition webpage or may be updated during advertisement presentation boundary to provide the user with the advertiser's additional interactive content as illustrated in FIG. 4.

The method 550 ends at OPERATION 595.

Figure 6:
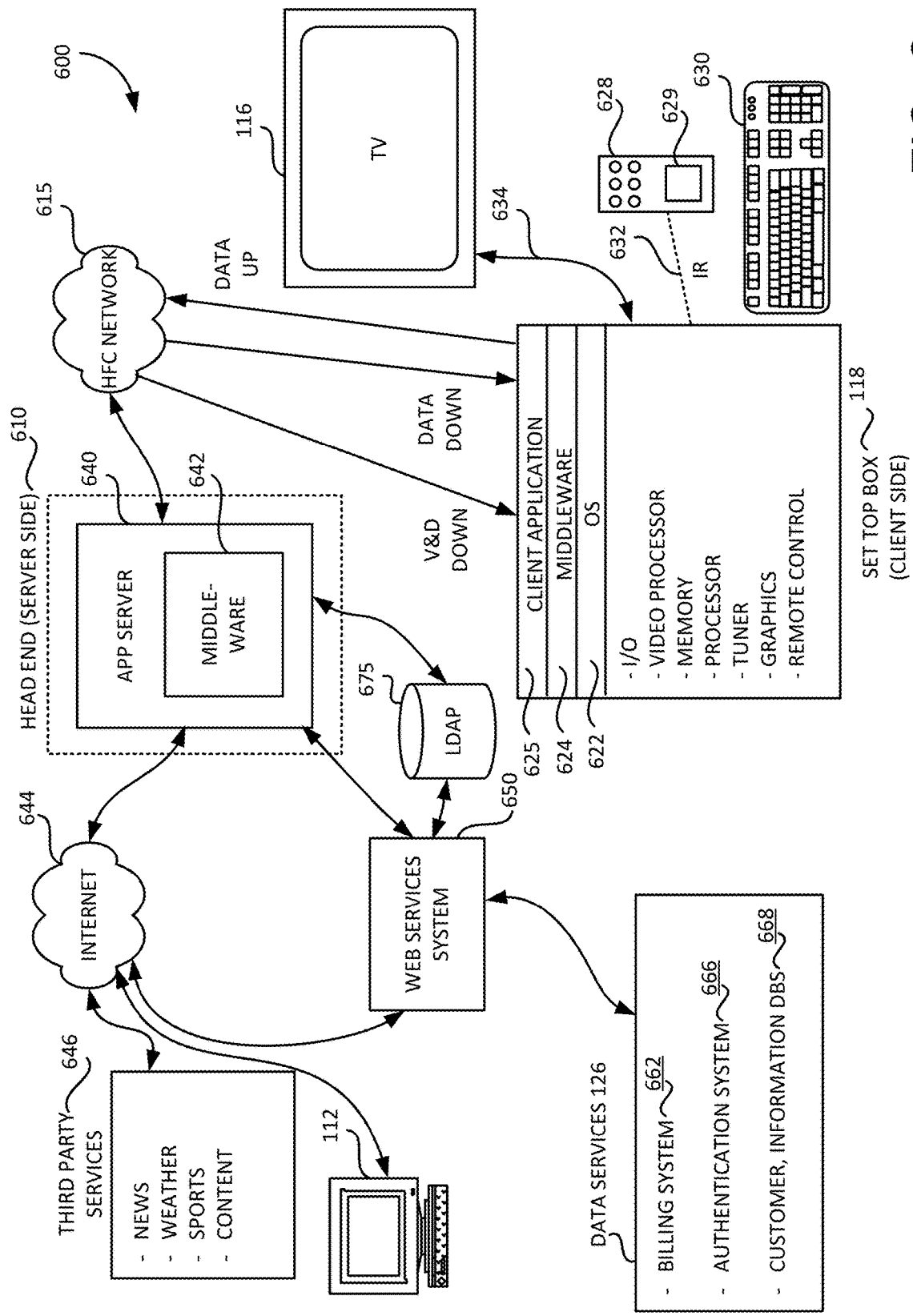
FIG. 6 is a simplified block diagram illustrating a cable television services system architecture providing an operating environment according to an embodiment.

FIG. 6 is a simplified block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing dynamic URL transmission. Referring now to FIG. 6, digital and analog video programming, information content and interactive television services are provided via a hybrid fiber coax (HFC) network 615 to a television set 116 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the client-side set-top box 118 and the server-side application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a client-side set-top box (STB) 118 functionally connected to a customer receiving device, such as the television set 116. As is understood by those skilled in the art, modern CATV systems 600 may provide a variety of services across the HFC network 615 including traditional digital and analog video programming, telephone services, high speed Internet access, video-on-demand, and information services.

On the client side of the CATV system 600, digital and analog video programming and digital and analog data are provided to the customer television set 116 via the set-top box (STB) 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628, keyboard 630, or other computing device 112, such as a tablet/slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television set 116 via a cable communication transport 634. A multi-channel tuner is provided for processing video and data to and from the STB 118 and the server-side head end system 610, described below.

The STB 118 also includes an operating system 622 for directing the functions of the STB 118 in conjunction with a variety of client applications 625. For example, if a client application 625 requires a news flash from a third-party news source to be displayed on the television 116, the operating system 622 may cause the graphics functionality and video processor of the STB 118, for example, to output the news flash to the television 116 at the direction of the client application 625 responsible for displaying news items.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications 625 and operating systems 622 that allow the client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the set-top box 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 6, between the HFC network 615 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 640 is typically passed through the "out of band" data links. Alternatively, an "in band" data carousel may be positioned in an "in band" channel into which a data feed may be processed from the server-side application server 640 through the HFC network 615 to the client-side STB 118. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs 118 for presentation to customers via televisions 116. As described above, a number of services may be provided by the CATV system 600, including digital and analog video programming, interactive television services, telephone services, video-on-demand services, targeted advertising, and provision of information content.

The application server 640 is a general-purpose computing system operative to assemble and manage data sent to and received from the client-side set-top box 118 via the HFC network 615. As described above with reference to the set-top box 118, the application server 640 includes a middleware layer 642 for processing and preparing data from the head end of the CATV system 600 for receipt and use by the client-side set-top box 118. For example, the application server 640 via the middleware layer 642 may obtain data from third-party services 646 via the Internet 644 for transmitting to a customer through the HFC network 615 and the set-top box 118. For example, content metadata a third-party content provider service may be downloaded by the application server via the Internet 644. When the application server 640 receives the downloaded content metadata, the middleware layer 642 may be utilized to format the content metadata for receipt and use by the set-top box 118. Therefore, content metadata may be sent and categorized based on the availability to the customer's program guide data.

According to one embodiment, data obtained and managed by the middleware layer 642 of the application server 640 is formatted according to the Extensible Markup Language and is passed to the set-top box 118 through the HFC network 615 where the XML-formatted data may be utilized by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 644 for provision to customers via the HFC network 615 and the set-top box 118. According to embodiments, client application 640 may include the client application 108 described herein.

According to embodiments, the application server 640 obtains customer support services data, including billing data, information on customer work order status, answers to frequently asked questions, services provider contact information, and the like from data services 126 for provision to the customer via an interactive television session. As illustrated in FIG. 6, the services provider data services 126 include a number of services operated by the services provider of the CATV system 600 which may include data on a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box identification associated with the customer. The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above.

An authentication system 666 may include information such as secure user names, subscriber profiles, subscriber IDs, and passwords utilized by customers for access to network services. As should be understood by those skilled in the art, the disparate systems 650, 662, 666, 668 may be integrated or provided in any combination of separate systems, wherein FIG. 6 shows only one example.

Figure 7:
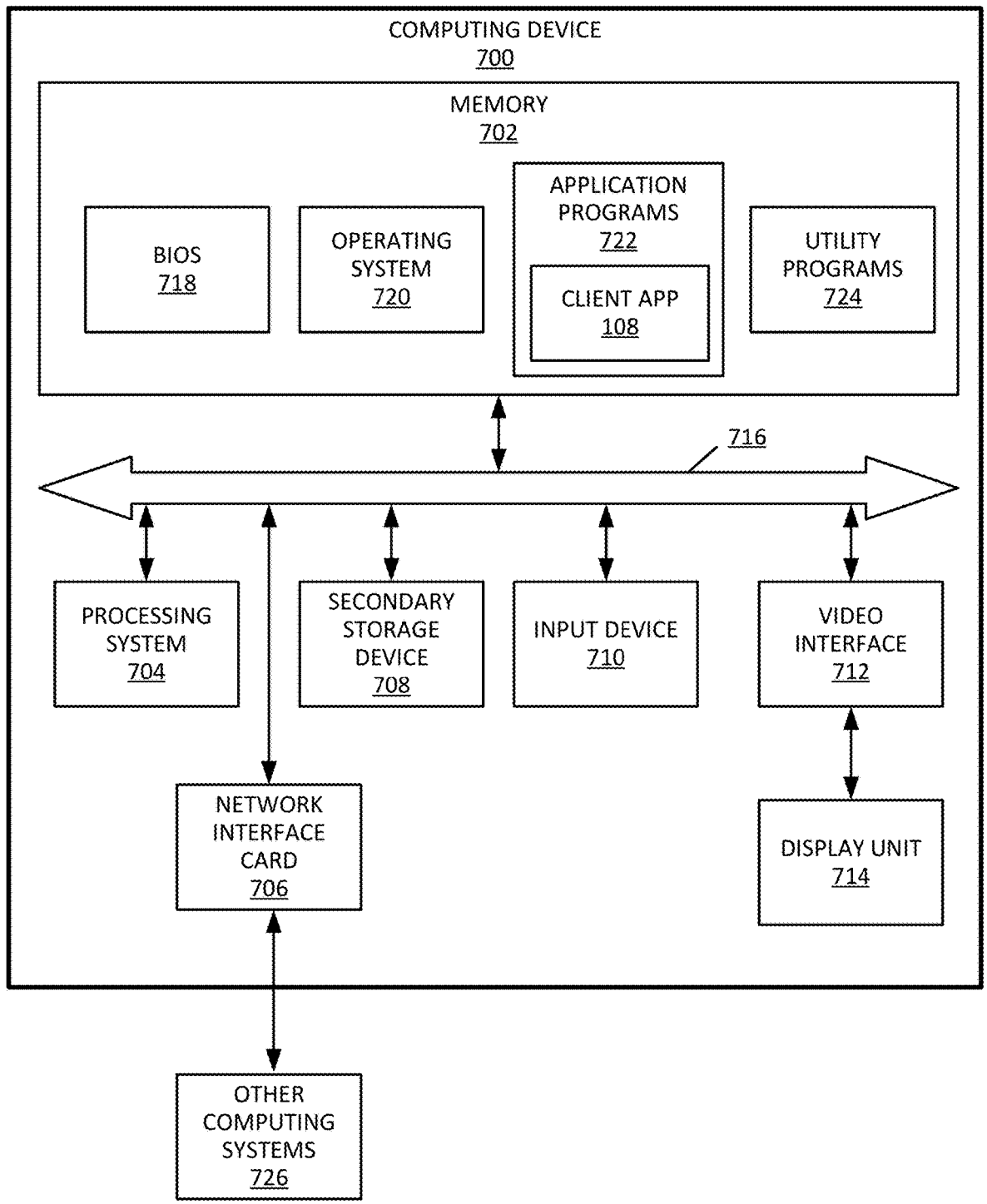
FIG. 7 is a simplified block diagram illustrating example physical components of a computing device with which embodiments may be practiced.

FIG. 7 is a simplified block diagram illustrating example physical components of a computing device 700 with which embodiments may be practiced. In some embodiments, one or a combination of the components 108, 110, 112, 114, 116, 118, 120, 122, 124, 126 of system 100 may be implemented using one or more computing devices like the computing device 700. It should be appreciated that in other embodiments, components 108, 110, 112, 114, 116, 118, 120, 122, 124, 126 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the client application 108 may be stored locally on computing device 700. Memory 702 thus may store the computer-executable instructions that, when executed by processor 704, cause the client application 108 to allow users to jump to desired channels by entering a request based information such as channel name, logo, call letter, or programs as described above with reference to FIGS. 1-6.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the client application 108. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

FIGS. 8A-B illustrate a suitable mobile computing environment, for example, a mobile computing device 110, a smart phone, a tablet personal computer 114, a laptop computer 112, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device's 800 location.

Although described herein in combination with mobile computing device 800, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method comprising:
receiving a recorded video content item that includes interactive content, wherein the interactive content is defined by an original URL recorded as part of historic metadata associated with the video content item at a time the video content item was recorded and the interactive content is made available for consumption with the recorded video content item according to an interactive hybrid form that includes a simultaneous display of the video content item and the interactive content;
receiving from a requesting device a request to play back the video content item on a viewing device;
determining the historic metadata has changed, wherein at least a portion of the historic metadata that has changed includes the original URL defining the interactive content;
providing, for display through a user interface associated with one or more of the requesting device and the viewing device, a first option to view the video content item simultaneously with updated interactive content defined by an updated URL according to the interactive hybrid form and a second option to view the video content item simultaneously with the interactive content defined by the original URL according to the interactive hybrid form;
receiving a selection of the first option to view the video content item simultaneously with the updated interactive content defined by the updated URL according to the interactive hybrid form;
substituting the original URL with the updated URL; and
providing the updated interactive content defined by the updated URL for simultaneous display in association with the video content item to be played back on the viewing device according to the interactive hybrid form.

2. The method of claim 1, wherein the requesting device is the viewing device.

3. The method of claim 1, further comprising receiving a viewer identifier, wherein receiving the viewer identifier comprises receiving one or more of a viewer's:
taste preferences;
location;
demographics;
history; and
device information.

4. The method of claim 3, further comprising analyzing the interactive content defined by the original URL based on the viewer identifier and the video content item.

5. The method of claim 1, further comprising updating the interactive content defined by the original URL based on one or more of:
business rules;
agreements with customers;
agreements with content owners;
upcoming events; and
sponsored events.

6. The method of claim 1, further comprising:
continually updating the original URL in real time.

7. The method of claim 1, further comprising providing an indication of availability of the interactive content via one or more of:
a menu option;
an icon display in a display area for the video content item;
an icon overlaid on a guide interface; and
a folder with a list view of video content items comprising the interactive content.

8. The method of claim 1, wherein providing the updated interactive content further comprises:
continuing to provide the updated interactive content until an indication of a selection of another interactive content item is received; and
enabling a browsing experience of the other interactive content.

9. The method of claim 1, further comprising updating the original URL in response to one or more of receiving an indication of a change in the video content item and an indication of an update to the original URL.

10. The method of claim 1, further comprising:
providing an option for updating the interactive content prior to updating the interactive content defined by the original URL; and
receiving an indication of a selection to update the interactive content.

11. The method of claim 1, further comprising providing within the user interface a list of recorded video content items that includes the video content item.

12. The method of claim 11, wherein receiving the request to play back the video content item includes receiving a selection of the video content item from the list of recorded video content items.

13. The method of claim 1, further comprising providing the video content item and the one or more of the interactive content and the updated interactive content in the interactive hybrid form that includes a simultaneous display of the video content item and at least one associated website.

14. A system comprising:
a processing unit; and
a memory coupled to the processing unit, the memory storing instructions that when executed by the processing unit cause the processing unit to:
receive a recorded video content item that includes interactive content, wherein the interactive content is defined by an original URL recorded as part of historic metadata associated with the video content item at a time the video content item was recorded and the interactive content is made available for consumption with the recorded video content item according to an interactive hybrid form that includes a simultaneous display of the video content item and the interactive content;
receive a request to play back the video content item on a viewing device;
determine the historic metadata has changed, wherein at least a portion of the historic metadata that has changed includes the original URL defining the interactive content;
provide, for display through a user interface associated with the viewing device, a first option to view the video content item simultaneously with updated interactive content defined by an updated URL according to the interactive hybrid form and a second option to view the video content item simultaneously with the interactive content defined by the original URL according to the interactive hybrid form;
receive a selection of the first option to view the video content item simultaneously with the updated interactive content defined by the updated URL according to the interactive hybrid form;
substitute the original URL with the updated URL; and
provide the updated interactive content defined by the updated URL for simultaneous display in association with the video content item to be played back on the viewing device according to the interactive hybrid form.

15. The system of claim 14, further comprising:
determining a type of the viewing device; and
displaying one or more of the interactive content and the updated interactive content in a format optimized for the determined type of viewing device.

16. The system of claim 14, wherein the video content item is a digital video recorder (DVR) recording or a video on demand (VOD) content item.

17. The system of claim 14, wherein the interactive content is displayed upon selecting the original URL when the video content is being played back.

18. The system of claim 14, wherein the updated interactive content is displayed upon selecting the updated URL when the video content is being played back.

19. The system of claim 14, wherein the interactive content includes one or more of:
a social website;
upcoming event information;
sponsored shows previews;
links to upcoming shows;
program guides;
links to other full length videos;
other videos; and
advertisements.

20. A non-transitory computer readable medium having computer- executable instructions comprising:
receiving a recorded video content item that includes interactive content, wherein the interactive content is defined by an original URL recorded as part of historic metadata associated with the video content item at a time the video content item was recorded and the interactive content is made available for consumption with the recorded video content item according to an interactive hybrid form that includes a simultaneous display of the video content item and the interactive content;
receiving a request to play back the video content item on a viewing device;
determining the historic metadata has changed, wherein at least a portion of the historic metadata that has changed includes the original URL defining the interactive content;
providing, for display through a user interface associated with the viewing device, a first option to view the video content item simultaneously with updated interactive content defined by an updated URL according to the interactive hybrid form and a second option to view the video content item simultaneously with the interactive content defined by the original URL according to the interactive hybrid form;
receiving a selection of the first option to view the video content item simultaneously with the updated interactive content defined by the updated URL according to the interactive hybrid form;
substituting the original URL with the updated URL; and
providing the updated interactive content defined by the updated URL for simultaneous display in association with the video content item to be played back on the viewing device according to the interactive hybrid form.

* * * * *